United States Patent

Fieberg et al.

[11] Patent Number: 5,661,281
[45] Date of Patent: Aug. 26, 1997

[54] VACUUM-TYPE INTERRUPTER HAVING AN ANNULAR INSULATOR

[75] Inventors: Klemens Fieberg, Berlin; Jörg Kusserow, Neuenhagen; Roman Renz; Klaus Oberndörfer, both of Berlin, all of Germany

[73] Assignee: Siemens Aktiengesellschaft, Munich, Germany

[21] Appl. No.: 564,165

[22] PCT Filed: Jun. 16, 1994

[86] PCT No.: PCT/DE94/00717

§ 371 Date: Dec. 15, 1995

§ 102(e) Date: Dec. 15, 1995

[87] PCT Pub. No.: WO95/00964

PCT Pub. Date: Jan. 5, 1995

[30] Foreign Application Priority Data

Jun. 18, 1993 [DE] Germany ............... 43 20 910.6
Jan. 28, 1994 [DE] Germany ............... 9401655 U

[51] Int. Cl.$^6$ ............................................. H01H 33/66
[52] U.S. Cl. ................................... 218/134; 218/136
[58] Field of Search ........................ 218/10, 118, 121, 218/123, 124, 125, 134–139, 155, 156

[56] References Cited

U.S. PATENT DOCUMENTS 3,252,050  5/1966  Lee ................................. 317/11
3,674,958  7/1972  Attia et al. ...................... 200/144 B
3,727,018  4/1973  Wesoloski et al. .............. 200/144 B
3,996,437  12/1976  Selzer ............................ 200/144 B
4,216,360  8/1980  Cherry et al. .................. 200/144
4,417,110  11/1983  Yanagisawa et al. ........... 200/144
4,614,850  9/1986  Kul et al. ....................... 200/144 B
4,746,777  5/1988  Bialkowski et al. ............. 200/144 B

FOREIGN PATENT DOCUMENTS 0 040 933  12/1981  European Pat. Off.  ....... H01H 33/66
0 054 670  6/1982  European Pat. Off.  ....... H01H 33/66
0 254 089  1/1988  European Pat. Off.  ....... H01H 33/66
42 14 550  11/1993  Germany ..................... H01H 33/66

*Primary Examiner*—Michael L. Gellner
*Assistant Examiner*—Michael A. Friedhofer
*Attorney, Agent, or Firm*—Kenyon & Kenyon

[57] ABSTRACT

To be able to reliably switch high short-circuit currents in the case of a vacuum-type interrupter of small construction, first of all the annular insulator (6), which together with two cap-like metal parts (5,7) forms the housing of the vacuum-type interrupter, is disposed concentrically to the bellows (10), which, in turn, is soldered to the movable contact in the immediate vicinity of the contact member (2). Secondly, a cap-shaped protective shield (9) open toward the arc gap is disposed at the base of the movable contact member (2).

4 Claims, 1 Drawing Sheet

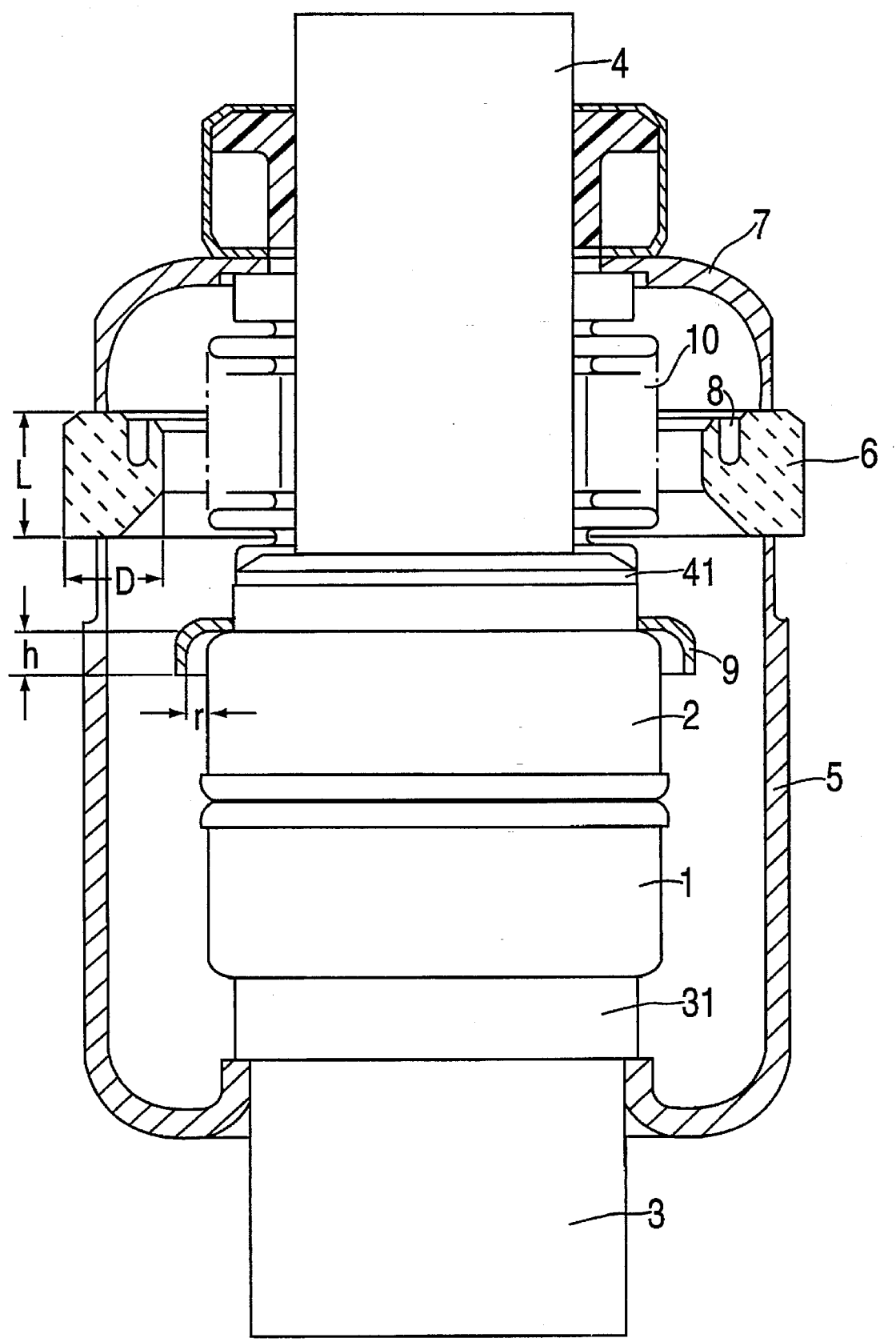

VACUUM-TYPE INTERRUPTER HAVING AN ANNULAR INSULATOR

BACKGROUND OF THE INVENTION

The invention relates generally to the field of electrical components and more particularly to the structural design of vacuum-type interrupters, whose housings are comprised of two cap-like metal parts and of an annular insulator and whose intended purpose, therefore, is for switching in a low-voltage range.

In the case of a known vacuum-type interrupter, which is used as a protective tube and, thus, for switching currents on the order of magnitude of 1 to 2 kA for voltages of up to about 1000 V, the housing enveloping the stationary contact and the contact that is axially movable thereto is comprised of two cap-like metal parts and of an annular insulator, to which the two cap-like metal parts are hermetically sealed by means of a knife-edge soldered joint. The stationary and the movable contact member, a cylindrical shield covering the annular insulator, and the bellows associated with the movable contact stud are disposed axially one behind the other inside the housing. The bellows is brazed with its one end to the supporting disk connected to the movable contact stud (EP 0 254 089 A1).

In the case of another known vacuum-type interrupter for the low voltage range, no cylindrical shielding is provided, but rather a cap-like protective shield that opens toward the bellows. In this case, the annular insulator, whose wall thickness is nearly equal to its axial length, is disposed concentrically to the bellows (EP 0 054 670 A2).

In the case of other vacuum-type interrupters used in the middle voltage range, it is likewise known to arrange a cap-shaped protective shield between the contact member and its rear space, in particular also between the movable contact member and the bellows associated with the movable contact, this protective shield protecting the bellows and, in some instances, an associated hollow cylindrical or disk-shaped insulating part from the condensing of vaporized electrode material (U.S. Pat. Nos. 3,674,958; 3,996,437; 4,417,110).

Another vacuum type interrupter switches d.c. currents up to about 6 kA given a d.c. voltage of up to 10 V. in that case one or both contacts have assigned to them a cap-like protective shield, which opens toward and projects over the arc gap and which shields the hollow cylindrical insulator disposed concentrically to the arc gap (U.S. Pat. No. 4,216,360 A1).

SUMMARY OF THE INVENTION

The invention is based on a vacuum-type interrupter that achieves the objective of having the smallest possible axial and radial dimensions, while being able to reliably switch short-circuit currents in the range of 50 to 100 kA.

To achieve this objective, the invention provides for a cap-like metal part allocated to a movable contact stud to be joined to the insulator in the outer area of an end face by a knife-edge soldered joint, for the bellows to be soldered with its one end in the immediate vicinity of the movable contact member to its contact stud, and for a cap-shaped protective shield open toward the arc gap to be disposed at the base of the movable contact member, said protective shield surrounding with its rim the base area of the contact member, the radial clearance of the shield rim from the periphery of the contact member amounting more or less to 2 to 4 mm and the height of the shield rim in the axial direction of the contact member amounting to at least about 4 mm, and being so dimensioned that any partial arcs that might be struck, whose roots at the outer wall of the movable contact member tend to migrate toward the contact stud, are confined to the zero-field space formed by the cap-shaped protective shield.

When a vacuum-type interrupter of such a design is used, it is possible to do without a special shield for protecting the inner insulating clearance formed by the annular insulator, since a relatively widely shaped end face of the annular insulator is turned away from the contact region. If need be, this insulating clearance can be extended by an axial groove. In addition, by arranging the annular insulator concentrically to the bellows and by using a special protective cap, the bellows is protected from electrical loads resulting from partial arcs, so that electrically produced thermal influences will not result in a premature failure of the bellows. In-particular, the roots of partial arcs are prevented from migrating on the outer surface of the movable contact member-toward the contact stud and, thus, also on to the bellows. This is essentially achieved in that, with the help of the cap-shaped protective shield, a zero-field space is created, in which the arc roots migrating in the axial direction of the movable switching contact are no longer struck, i.e., they are confined.

Thus, while providing a high switching capacity, a vacuum-type interrupter designed in accordance with the invention is distinguished by a compact type of construction both in the axial as well as in the radial direction.

BRIEF DESCRIPTION OF THE DRAWING

The FIGURE depicts an exemplary embodiment of the new vacuum-type interrupter.

DETAILED DESCRIPTION

As illustrated in the FIGURE, a stationary contact stud 3 having a transition region 31 is allocated to a stationary contact member 1. In addition, a contact stud 4 having a transition region 41 extending from the contact stud to the base of the contact member is allocated to a movable contact member 2. The two contact members 1 and 2 are enveloped by a housing comprised of a bottom metallic cap 5, an annular, insulator 6, and an upper metallic cap 7. The bottom cap is brazed directly to the stationary contact stud 3, while the upper cap 7 is hermetically sealed to the transition region 41 of the movable contact stud 4 by way of a bellows 10. The two caps 5 and 7 are joined to the annular insulator 6 by a knife-edge soldered. Here, the radial wall thickness D of the annular insulator 6 is selected to be nearly as large as the axial length L of the insulator. By "nearly as large", one understands a deviation of a max. of ±30%. By so dimensioning the annular insulator 6 and the knife-edge soldered joint provided in the outer area of the end faces of the insulator, at the end face turned away from the contact members 1 and 3, the insulator is given an annular insulating surface wide enough to guarantee the inner dielectric strength of the vacuum-type interrupter. If need be, a circumferential groove 8 can be provided to enhance this inner dielectric strength.

The structural design of the housing of the vacuum-type interrupter causes the potential associated with the stationary contact member 1 to be conducted via the metallic cap 5 up to the rear space of the movable contact member 2 and, thus, up to the vicinity of the bellows 10. Through this measure, one reliably avoids any rise in potential of the metal cap 7 with respect to the contact stud 4 caused by arc products, which would result in a current flow across the bellows 10.

Finally, disposed at the base of the movable contact member 2 is a cap-shaped protective shield 9 which is expediently made of copper and opens toward the arc gap so that its radial clearance r from the contact member amounts to about 2 to 4 mm and its axial height h to about 4 to 6 mm. This guarantees that any partial arcs that might be struck, whose roots at the outer wall of the movable contact member 2 tend to migrate toward the contact stud 4, are confined to the zero-field space formed by the cap-like protective shield, the result being that such partial arcs are extinguished. The protective shield 9 can also be arranged on a shoulder of the transition region 41 and be diminished in diameter.

Cup-shape contacts designed as radial field or axial magnetic field contacts can be used, for example, for the two contact members 1 and 2. However, other known contact forms also come under consideration.

What is claimed is:

1. A vacuum-type interrupter comprising:

a stationary contact member;

a second contact member axially movable with respect to said stationary contact member;

a contact stud associated with said second contact member;

a bellows soldered to said contact stud with one end of the bellows in the immediate vicinity of said second contact member;

a housing surrounding said stationary contact member, said second contact member and said bellows, said housing including, a first cap-like metal part allocated to said contact stud, a second cap-like metal part, and an annular insulator being disposed concentrically with respect to said bellows and having a wall thickness substantially equal to an axial length of the annular insulator in, area of an end face wherein said second cap-like metal part is joined to said annular insulator by a knife-edge soldered joint, and a cap-shaped protective shield open toward an arc gap and disposed at a base of the second contact member, said protective shield including a rim surrounding said base of said second contact member, a radial clearance of the rim from a periphery of said second contact member amounting to approximately 2 to 4 and a height of the shield rim in an axial direction of said second contact member amounting to at least about 4 mm, and being so dimensioned that any partial arcs that might be struck, in which roots of the arcs at an outer wall of the movable contact member tend to migrate toward the contact stud, are confined to a zero-field space formed by the cap-shaped protective shield.

2. The vacuum-type interrupter of claim 1, wherein the height of the shield rim in the axial direction of said second contact member is smaller than a height of said second contact member.

3. The vacuum-type interrupter of claim 1, wherein the cap-shaped protective shield is made of copper.

4. The vacuum-type interrupter of claim 2, wherein the cap-shaped protective shield is made of copper.

* * * * *